United States Patent
Roper et al.

(10) Patent No.: US 11,827,092 B2
(45) Date of Patent: Nov. 28, 2023

(54) VEHICLE WITH FRONT-WHEEL-ASSIST SYSTEM

(71) Applicant: Komatsu America Corp., Chicago, IL (US)

(72) Inventors: Bradley Roper, Dunlap, IL (US); Yousuke Yabe, Hitachinaka (JP)

(73) Assignee: Komatsu America Corp., Chicago, IL (US)

(*) Notice: Subject to any disclaimer, the term of this patent is extended or adjusted under 35 U.S.C. 154(b) by 346 days.

(21) Appl. No.: 17/166,582

(22) Filed: Feb. 3, 2021

(65) Prior Publication Data

US 2021/0268901 A1 Sep. 2, 2021

Related U.S. Application Data

(60) Provisional application No. 62/984,115, filed on Mar. 2, 2020.

(51) Int. Cl.
*B60K 17/356* (2006.01)
*B60K 7/00* (2006.01)
(Continued)

(52) U.S. Cl.
CPC ............ *B60K 17/356* (2013.01); *B60G 3/02* (2013.01); *B60G 7/008* (2013.01); *B60K 7/0007* (2013.01);
(Continued)

(58) Field of Classification Search
CPC ........ B60G 2300/026; B60G 2204/30; B60K 2007/0076; B60K 2007/0092;
(Continued)

(56) References Cited

U.S. PATENT DOCUMENTS 3,812,928 A * 5/1974 Rockwell ............... B60L 50/51
310/67 R
4,991,698 A * 2/1991 Hanson .................. B60G 3/01
267/221

(Continued)

FOREIGN PATENT DOCUMENTS

CN 1950232 A 4/2007
CN 201601566 U 10/2010
(Continued)

OTHER PUBLICATIONS

Office Action regarding Canadian Patent Application No. 3108976, dated Apr. 11, 2022.
(Continued)

*Primary Examiner* — Jeffrey J Restifo
(74) *Attorney, Agent, or Firm* — Harness, Dickey & Pierce, P.L.C.

(57) ABSTRACT

A heavy-duty vehicle may include a vehicle frame, a plurality of rear-wheel assemblies, and a plurality of front-wheel assemblies. The wheel assemblies are mounted to the vehicle frame. Each of the front-wheel assemblies may include a rim, a spindle, a brake assembly, a motor, and a transmission assembly. The spindle may be at least partially disposed within the rim. The brake assembly may be disposed within the rim and may extend around the spindle. The motor may be disposed within the cavity in the spindle. At least a portion of the motor is disposed between first and second axial ends of the rim. The transmission assembly may be disposed within the rim. The transmission assembly may transmit rotary motion of the motor to the rim to rotate the rim relative to the spindle.

20 Claims, 3 Drawing Sheets

(51) Int. Cl.
  *B60G 7/00* (2006.01)
  *B60G 3/02* (2006.01)
  *B60T 1/06* (2006.01)
(52) U.S. Cl.
  CPC .......... *B60T 1/06* (2013.01); *B60G 2204/143* (2013.01); *B60G 2204/30* (2013.01); *B60G 2300/026* (2013.01); *B60K 2007/0038* (2013.01)
(58) Field of Classification Search
  CPC .... B60K 2007/0007; B60K 2007/0038; B60K 17/356; B60T 1/06
  See application file for complete search history.

(56) References Cited

U.S. PATENT DOCUMENTS

| | | | | |
|---|---|---|---|---|
| 6,328,123 | B1* | 12/2001 | Niemann | H02K 9/197 180/65.6 |
| 6,651,762 | B1 | 11/2003 | Hokanson et al. | |
| 8,616,314 | B2 | 12/2013 | Murata | |
| 10,066,735 | B1* | 9/2018 | Martin | F16H 57/12 |
| 11,211,844 | B1* | 12/2021 | Bonny | H02K 11/215 |
| 11,338,669 | B1* | 5/2022 | Langenfeld | F16H 57/031 |
| 11,346,439 | B1* | 5/2022 | Langenfeld | F16H 57/082 |
| 2003/0218374 | A1* | 11/2003 | Kress | B60P 1/16 298/17 R |
| 2005/0247496 | A1* | 11/2005 | Nagaya | B60K 7/0007 180/65.51 |
| 2006/0070778 | A1* | 4/2006 | De Veny | B60K 17/046 180/65.1 |
| 2007/0188125 | A1* | 8/2007 | Shepard | B60L 53/14 318/778 |
| 2007/0199750 | A1* | 8/2007 | Suzuki | B60G 7/008 180/65.51 |
| 2008/0053719 | A1* | 3/2008 | Yoshino | F16D 65/12 188/72.1 |
| 2008/0070736 | A1* | 3/2008 | Yoshino | B60K 7/0007 301/6.5 |
| 2008/0169141 | A1* | 7/2008 | Suzuki | H02K 7/085 180/65.7 |
| 2008/0196995 | A1* | 8/2008 | Mikami | F16D 41/06 384/607 |
| 2008/0283314 | A1* | 11/2008 | Suzuki | H02K 15/14 180/65.51 |
| 2008/0283315 | A1* | 11/2008 | Suzuki | B60K 6/48 180/65.51 |
| 2009/0166112 | A1* | 7/2009 | Yoshino | B60K 7/0007 180/65.51 |
| 2009/0283345 | A1* | 11/2009 | Kabrick | B60K 17/046 180/65.51 |
| 2009/0312134 | A1* | 12/2009 | Schoon | H02K 7/116 475/154 |
| 2010/0140020 | A1* | 6/2010 | Murahashi | B60B 27/04 184/6.12 |
| 2011/0209938 | A1* | 9/2011 | Basadzishvili | B60K 7/0007 180/305 |
| 2012/0298432 | A1* | 11/2012 | Lee | B60L 8/003 180/55 |
| 2013/0065724 | A1* | 3/2013 | Shinohara | B60K 17/046 475/159 |
| 2013/0088068 | A1* | 4/2013 | Walser | B60L 7/24 301/6.5 |
| 2013/0161148 | A1* | 6/2013 | Schoon | F16D 55/38 475/116 |
| 2014/0015382 | A1* | 1/2014 | Kim | H02K 7/14 310/67 R |
| 2014/0139009 | A1 | 5/2014 | Bindl et al. | |
| 2015/0028658 | A1* | 1/2015 | Friedmann | B60K 7/0007 301/6.5 |
| 2015/0084397 | A1* | 3/2015 | Kudo | B60B 35/16 903/952 |
| 2016/0059710 | A1 | 3/2016 | Richey et al. | |
| 2016/0261171 | A1 | 9/2016 | Mendes et al. | |
| 2016/0356197 | A1 | 12/2016 | Scott | |
| 2017/0314666 | A1* | 11/2017 | Furuuchi | F16H 57/0424 |
| 2018/0194410 | A1* | 7/2018 | Beiler | B60K 17/046 |
| 2018/0252283 | A1* | 9/2018 | Martin | F16D 65/186 |
| 2018/0252297 | A1* | 9/2018 | Martin | F16H 57/082 |
| 2018/0354473 | A1* | 12/2018 | Naitou | B60T 1/062 |
| 2019/0070950 | A1 | 3/2019 | Adachi | |
| 2020/0016973 | A1* | 1/2020 | Hagihara | F16H 57/04 |
| 2021/0094406 | A1* | 4/2021 | Payne | B60K 7/0007 |
| 2021/0252967 | A1* | 8/2021 | Iwabuchi | B60B 35/125 |
| 2021/0268901 | A1* | 9/2021 | Roper | B60T 1/06 |
| 2022/0221048 | A1* | 7/2022 | Remboski | H02K 7/116 |

FOREIGN PATENT DOCUMENTS

| | | |
|---|---|---|
| CN | 102574458 A | 7/2012 |
| CN | 204845518 U | 12/2015 |

OTHER PUBLICATIONS

Komatsu America Corp., "Komatsu 930E-4SE—Electric Drive Truck." Brochure, AESS778-01, 2009.
Komatsu America Corp., "Komatsu 930E-5—Electric Drive Truck." Brochure, AESS921-00, 2019.
Canadian Office Action regarding Patent Application No. 3108976, dated Dec. 1, 2022.
Chinese Office Action regarding Patent Application No. 2021102174421, dated Nov. 23, 2022.

* cited by examiner

VEHICLE WITH FRONT-WHEEL-ASSIST SYSTEM

CROSS-REFERENCE TO RELATED APPLICATIONS

This application claims the benefit of U.S. Provisional Application No. 62/984,115, filed on Mar. 2, 2020. The entire disclosure of the above application is incorporated herein by reference.

FIELD

The present disclosure relates to a front-wheel-assist system for a heavy-duty vehicle.

BACKGROUND

This section provides background information related to the present disclosure and is not necessarily prior art.

Heavy-duty vehicles, such as large, off-highway dump trucks (e.g., articulated trucks, underground haulage trucks, etc.), can lose traction in slippery and/or high rolling-resistance conditions (e.g., snowy, icy, muddy, wet, sandy, and/or oily conditions). Such loss of traction can cause the vehicle to fish tail or slide, especially when the vehicle is braking. This is because many heavy-duty vehicles have only rear-wheel-drive systems and only rear-wheel retarder brakes. That is, front wheel assemblies in conventional heavy-duty vehicles do not have adequate space for incorporating front-wheel motors. Installing front-wheel motors outside of the front-wheel assemblies would complicate the structures that connect the front-wheel assemblies to the suspension, which would increase the cost of such assemblies and reduce durability and serviceability. The present disclosure provides front-wheel assemblies with front-wheel-assist systems that can improve a vehicle's traction in slippery conditions, improve rear-transmission gear life, and increase the vehicle's torque at low speeds. The front-wheel-assist systems of the present disclosure are efficiently packaged within the front-wheel assemblies and allow for simple connections to the suspension.

SUMMARY

This section provides a general summary of the disclosure, and is not a comprehensive disclosure of its full scope or all of its features.

In one form, the present disclosure provides a vehicle (e.g., a heavy-duty construction or mining vehicle) that may include a vehicle frame, a plurality of rear-wheel assemblies, and a plurality of front-wheel assemblies. The wheel assemblies are mounted to the vehicle frame. Each of the front-wheel assemblies may include a rim, a spindle, a brake assembly, a motor, and a transmission assembly. The spindle extends into the rim and supports the rim for rotation about the spindle. The spindle may include a cavity disposed within the rim. The brake assembly may be disposed within the rim and may extend around the spindle. The motor may be disposed within the cavity in the spindle. At least a portion of the motor is disposed between first and second axial ends of the rim. In some configurations, the entire motor is disposed between the first and second axial ends of the rim. The transmission assembly may be disposed within the rim. The transmission assembly may transmit rotary motion of an output shaft of the motor to the rim to rotate the rim relative to the spindle.

In some configurations of the vehicle of the above paragraph, each of the front-wheel assemblies includes a hub rotationally fixed to the rim and extending around a portion of the spindle. A bearing may rotatably support the hub on the spindle.

In some configurations of the vehicle of either of the above paragraphs, a first portion of the brake assembly is fixed to the hub, and a second portion of the brake assembly is fixed to the spindle.

In some configurations of the vehicle of any of the above paragraphs, the brake assembly is disposed between the first and second axial ends of the rim.

In some configurations of the vehicle of any of the above paragraphs, a portion of the spindle extends out of an axial end of the rim and engages a suspension assembly.

In some configurations of the vehicle of any of the above paragraphs, the suspension assembly includes a first pillar and a second pillar. A first axial end of the first pillar may be attached to the spindle, and a second axial end of the first pillar may be reciprocatingly received in the second pillar. The second pillar may be attached to the vehicle frame.

In some configurations of the vehicle of any of the above paragraphs, the first axial end of the first pillar is mounted on an upper surface of the spindle.

In some configurations of the vehicle of any of the above paragraphs, each of the front-wheel assemblies includes a tire rotationally fixed to the rim and extending around an outer periphery of the rim.

In some configurations of the vehicle of any of the above paragraphs, the vehicle includes only two of the front-wheel assemblies, and each of the front-wheel assemblies includes only a single rim.

In some configurations of the vehicle of any of the above paragraphs, the vehicle includes only two of the rear-wheel assemblies, and each of the rear-wheel assemblies includes two rear rims.

In some configurations of the vehicle of any of the above paragraphs, the two of the rear-wheel assemblies are disposed on a single axle assembly.

In some configurations, the vehicle of any of the above paragraphs includes a dump body supported by the vehicle frame. The dump body is rotatable relative to the vehicle frame.

In another form, the present disclosure provides a vehicle that may include a vehicle frame, two rear-wheel assemblies, and two front-wheel assemblies. The two rear-wheel assemblies are mounted to the vehicle frame. Each of the rear-wheel assemblies may include a pair of rear rims. The rear rims of the two rear-wheel assemblies may all be arranged in a single in-line configuration (e.g., two rear rims on each lateral side of the vehicle, and with all four rear rims on a single axle assembly). The two front-wheel assemblies are disposed on opposing lateral sides of the vehicle frame. Each of the front-wheel assemblies may include a single front rim, a single spindle, a single motor, and a single transmission assembly. The tire is rotationally fixed to the front rim and extends around an outer periphery of the front rim. The spindle may extend into the front rim and may support the front rim for rotation about the spindle. The spindle includes a cavity disposed within the front rim. The motor may be disposed within the cavity in the spindle. At least a portion of the motor may be disposed between first and second axial ends of the front rim. In some configurations, the entire motor is disposed between the first and second axial ends of the rim. The transmission assembly may be disposed within the front rim. The transmission assembly transmits rotary motion of an output shaft of the motor to the front rim to rotate the front rim relative to the spindle. In some configurations, the motor, the transmission assembly, and the rim share a common longitudinal axis.

In some configurations of the vehicle of the above paragraph, each of the front-wheel assemblies includes a hub rotationally fixed to the front rim and extending around a portion of the spindle. A bearing may rotatably support the hub on the spindle.

In some configurations of the vehicle of either of the above paragraphs, each of the front-wheel assemblies includes a brake assembly disposed within the front rim and extending around the spindle.

In some configurations of the vehicle of any of the above paragraphs, a first portion of the brake assembly is fixed to the hub, and a second portion of the brake assembly is fixed to the spindle.

In some configurations of the vehicle of any of the above paragraphs, the brake assembly is disposed between the first and second axial ends of the front rim.

In some configurations of the vehicle of any of the above paragraphs, a portion of the spindle extends out of an axial end of the front rim and engages a suspension assembly.

In some configurations of the vehicle of any of the above paragraphs, the suspension assembly includes a first pillar and a second pillar. A first axial end of the first pillar may be attached to the spindle, and a second axial end of the first pillar may be reciprocatingly received in the second pillar. The second pillar may be attached to the vehicle frame.

In some configurations of the vehicle of any of the above paragraphs, the first axial end of the first pillar is mounted on an upper surface of the spindle.

In another form, the present disclosure provides a front-wheel assembly that may include a rim, a spindle, a brake assembly, a motor, and a transmission assembly. The spindle may extend into the rim such that the spindle is at least partially disposed within the rim. The brake assembly may be disposed within the rim and may extending around the spindle. The motor may be disposed in the spindle such that at least a portion of the motor is disposed between first and second axial ends of the rim. In some configurations, the entire motor is disposed between the first and second axial ends of the rim. The transmission assembly may be disposed within the rim. The transmission assembly may transmit rotary motion to the rim to rotate the rim relative to the spindle.

In some configurations of the front-wheel assembly of the above paragraph, the motor, the transmission assembly, and the rim share a common longitudinal axis.

In some configurations of the front-wheel assembly of either of the above paragraphs, the brake assembly is disposed between the first and second axial ends of the rim.

In some configurations of the front-wheel assembly of any of the above paragraphs, each of the front-wheel assemblies includes a hub rotationally fixed to the rim and extending around a portion of the spindle.

In some configurations of the front-wheel assembly of any of the above paragraphs, a bearing rotatably supports the hub on the spindle.

In some configurations of the front-wheel assembly of any of the above paragraphs, a first portion of the brake assembly is fixed to the hub.

In some configurations of the front-wheel assembly of any of the above paragraphs, a second portion of the brake assembly is fixed to the spindle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
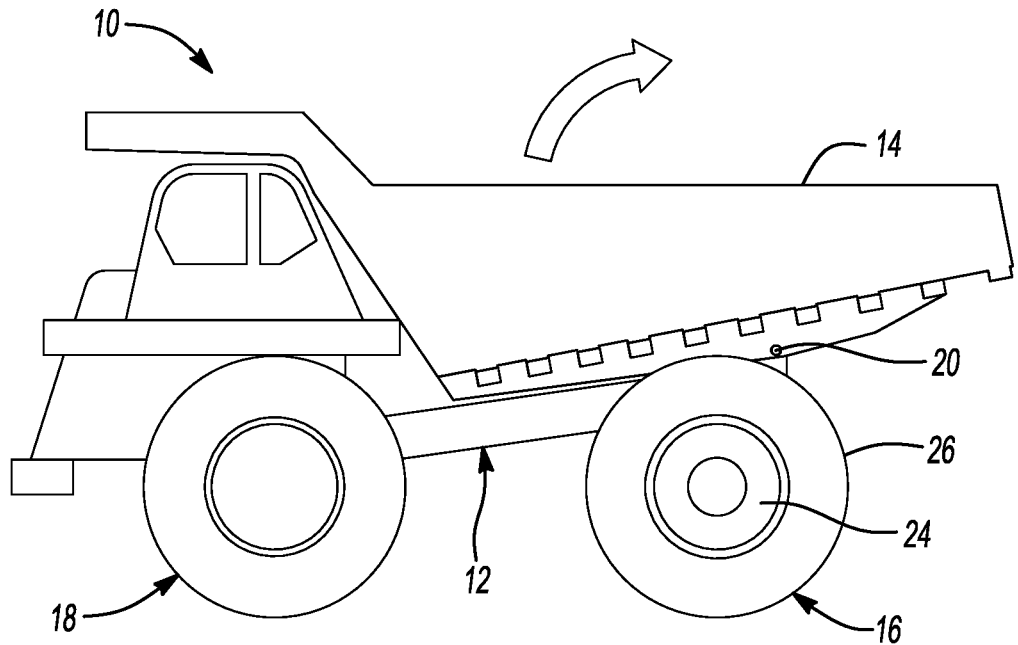
FIG. 1 is a schematic side view of a heavy-duty vehicle according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
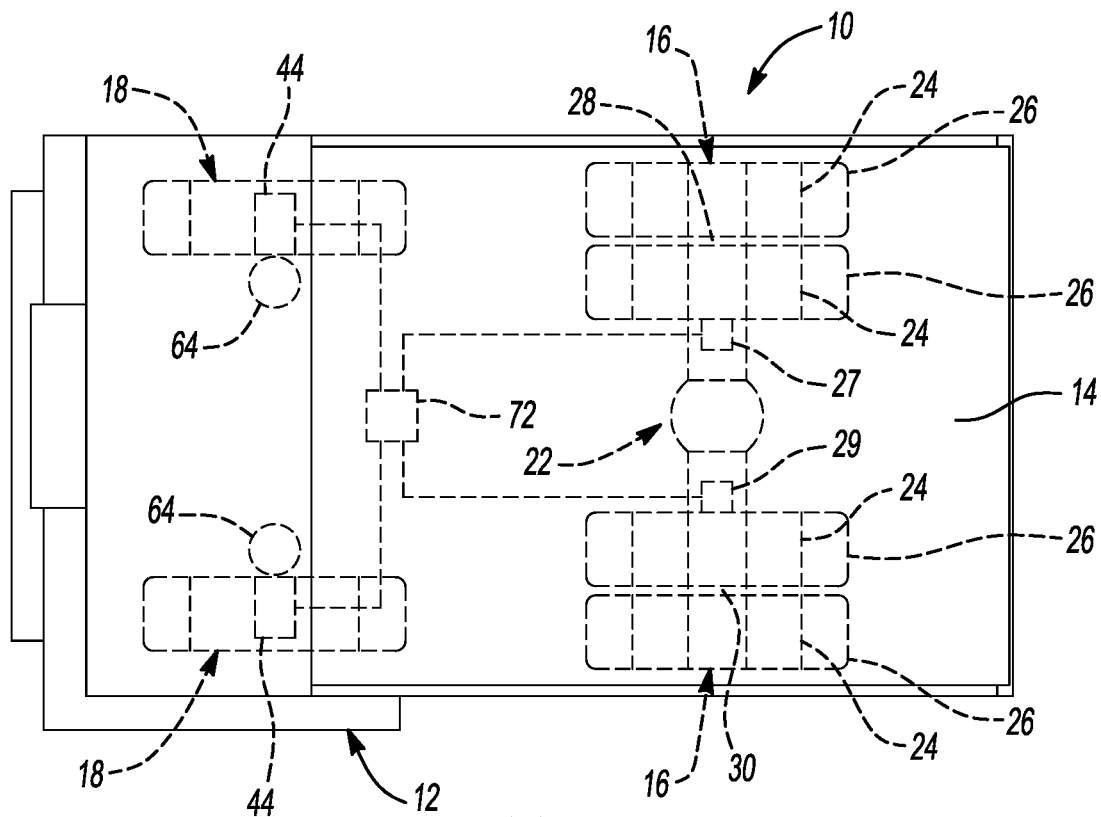
FIG. 2 is a schematic overhead view of the vehicle of FIG. 1.
Figure 3:
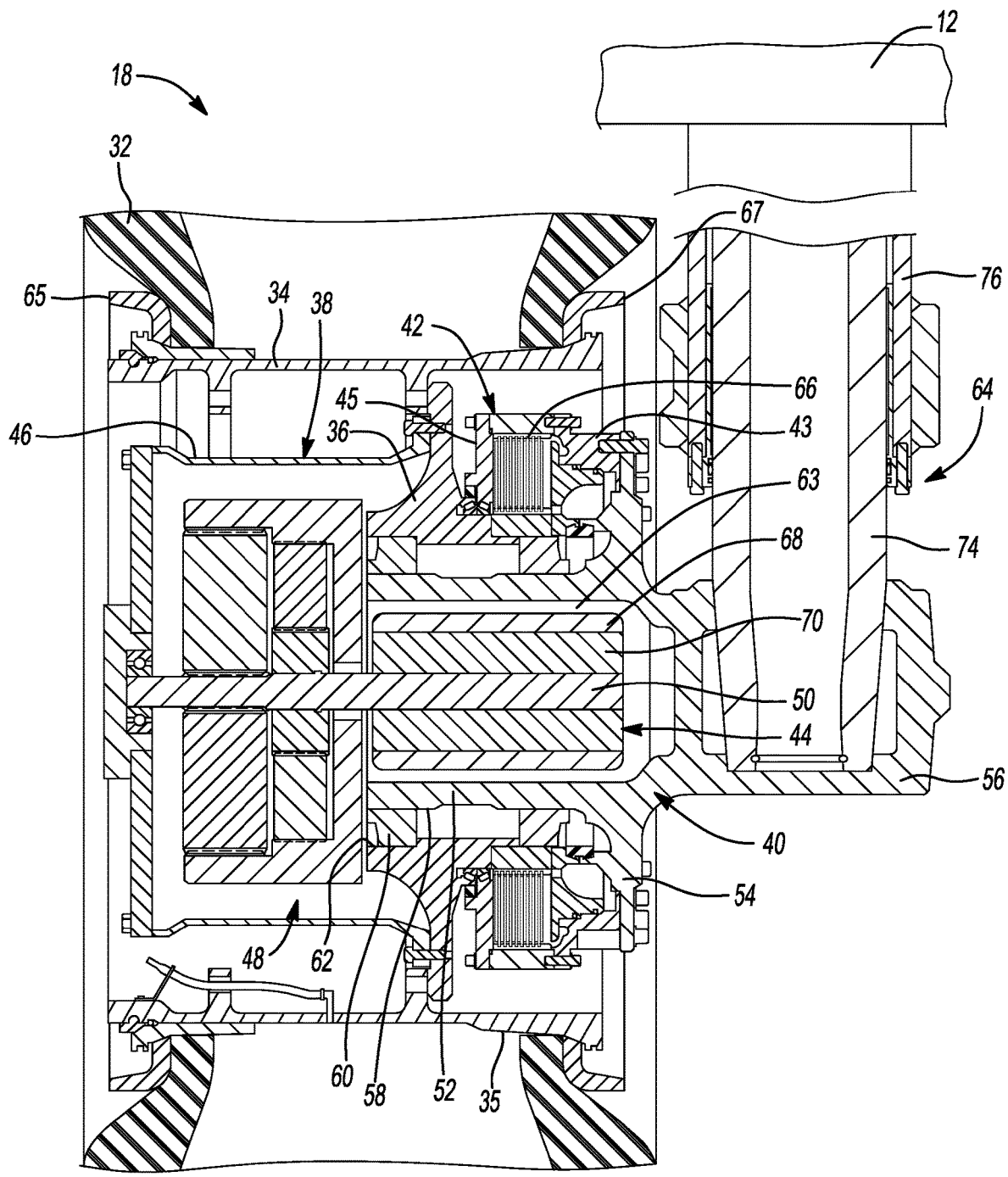
FIG. 3 is a partial cross-sectional view of a front-wheel assembly of the vehicle.

With reference to FIGS. 1-3, a heavy-duty vehicle 10 is provided. For example, the vehicle 10 may be an off-highway dump truck or an articulated dump truck for various heavy-duty applications such as excavation, construction, and/or mining. The vehicle 10 may include a vehicle frame or chassis 12, a dump body 14, a plurality of rear-wheel assemblies 16, and a plurality of front-wheel assemblies 18. The dump body 14 is supported on the vehicle frame 12 and may be rotatable relative to the vehicle frame 12 about a pivot 20 disposed at or near a rear end of the vehicle frame 12. A hydraulic hoist system can be actuated to rotate the dump body 14 relative to the vehicle frame 12 between a load position (shown in FIG. 1) and an unload (or dump) position.

The rear-wheel assemblies 16 and the front-wheel assemblies 18 support the vehicle frame 12. The rear axle assembly 22 and rear-wheel assemblies 16 can be driven by a combustion engine and/or one or more electric motors. In the example vehicle 10 shown in FIGS. 1 and 2, each of the rear-wheel assemblies 16 includes a pair of rims 24 and a pair of tires 26 mounted on respective rims 24. As shown in FIG. 2, the rims 24 of a first one of the rear-wheel assemblies 16 can be rotatably mounted on a first spindle 28, and the rims 24 of a second one of the rear-wheel assemblies 16 can be rotatably mounted on a second spindle 30. In this manner, the four rims 24 and tires 26 of the two rear-wheel assemblies 16 may be arranged in an in-line configuration (i.e., with the two rims 24 and tires 26 of one rear-wheel assembly 16 disposed on one lateral side of the vehicle frame 12 and the two rims 24 and tires 26 of the other rear-wheel assembly 16 disposed on the other lateral side of the vehicle frame 12). In some configurations, a first electric motor 27 may drive the first one of rear-wheel assemblies 16, and a second electric motor 29 may drive the second one of rear-wheel assemblies 16.

Referring now to FIG. 3, each of the front-wheel assemblies 18 may include a tire 32, a rim 34, a hub 36, a transmission assembly 38, a spindle 40, a brake assembly 42, and an electric motor 44. The transmission assembly 38 and the motor 44 form a front-wheel-assist system for the front-wheel assembly 18. The front-wheel-assist systems of each of the front-wheel assemblies 18 can be controlled independently of each other to provide improved traction and performance for the vehicle 10, as will be described in more detail below.

The rim 34 is a generally cylindrical and annular body. The tire 32 is mounted on the rim 34 and extends around an outer circumferential surface 35 of the rim 34. The hub 36 is an annular body disposed within the rim 34 and rotationally fixed to the rim 34.

The transmission assembly 38 may be disposed within the rim 34 and may include a transmission housing 46 and a final drive transmission 48 (shown schematically in FIG. 3). The final drive transmission 48 is supported by and disposed within the transmission housing 46. The transmission housing 46 may be rotationally fixed to the hub 36 and the rim 34. In some configurations, the transmission housing 46 could be a part of or integrally formed within the rim 34. The final drive transmission 48 may be engaged with an output shaft 50 of the motor 44 and may include one or more clutches and/or gears that transmit rotational motion of the output shaft 50 to the transmission housing 46, the hub 36, the rim 34, and the tire 32. The transmission assembly 38 could be a planetary gear mechanism, for example, or any other suitable type of transmission mechanism.

The spindle 40 may include a wheel-mount portion 52, a flange portion 54, and a suspension-mount portion 56. The wheel-mount portion 52 and the flange portion 54 may be disposed within the rim 34. The wheel-mount portion 52 may be a generally cylindrical and annular body having an outer diametrical surface 58 that rotatably supports the hub 36. One or more bearings 60 may be disposed radially between the outer diametrical surface 58 and an inner diametrical surface 62 of the hub 36 to facilitate rotation of the hub 36 (and hence the rim 34 and tire 32) relative to the spindle 40. The wheel-mount portion 52 may include a cavity 63 that is circumferentially surrounded by the outer diametrical surface 58. The motor 44 may be mounted within the cavity 63 such that the motor 44 is disposed within the rim 34. The motor 44 may be disposed axially between a first axial end 65 of the rim 34 (i.e., an axial end facing away from the other front-wheel assembly 18) and a second axial end 67 of the rim (i.e., an axial end facing toward the other front-wheel assembly 18).

The flange portion 54 of the spindle 40 may extend radially outward from the wheel-mount portion 52 and may engage the brake assembly 42. The flange portion 54 may be disposed axially between the wheel-mount portion 52 and the suspension-mount portion 56. The suspension-mount portion 56 may extend axially away from the flange portion 54 and out of the rim 34. A suspension assembly 64 may be mounted to the suspension-mount portion 56 and the vehicle frame 12. While not specifically shown in the figures, a steering system component (e.g., a steering arm or steering knuckle) may also be attached to the suspension-mount portion 56.

The suspension assembly 64 can be any suitable type of suspension assembly, such as a sliding pillar suspension assembly. In some configurations, the suspension assembly can be a MacPherson independent suspension system or a double-wishbone suspension system, for example, or any other suitable type of suspension system. As shown in FIG. 3, the suspension assembly 64 can include a first pillar member 74 and a second pillar member 76. An axial end of the first pillar member 74 may extend into and be attached to the suspension-mount portion 56 of the spindle 40. The opposite axial end of the first pillar member 74 may be reciprocatingly received in the second pillar member 76. The second pillar member 76 may be mounted to the vehicle frame 12. Springs and/or pneumatic dampers, for example, may dampen the movement of the first pillar member 74 within the second pillar member 76.

The brake assembly 42 may be disposed within the rim 34 and may be mounted to the hub 36 and the flange portion 54 of the spindle 40. That is, a first portion 43 of the brakes assembly 42 may be fixed to the spindle 40, and a second portion 45 of the brake assembly 42 may be fixed to the hub 36. The brake assembly 42 may be hydraulically or pneumatically actuated, for example, and may include a clutch pack or multiple brake discs 66 disposed between the first and second portions 43, 45. Actuation of the brake assembly 42 may resist relative rotation between the first and second portions 43, 45, thereby resisting rotation of the hub 36, rim 34, and tire 32 relative to the spindle 40.

As described above, the motor 44 may be disposed within the spindle cavity 63 and within the rim 34 (i.e., between the axial ends 65, 67 of the rim 34). The motor 44 can include a stator 68 and a rotor 70. The stator 68 may be fixed relative to the spindle 40. The rotor 70 may be rotatable relative to the stator 68 and spindle 40 and may drive the output shaft 50. As described above, the transmission 48 transmits rotational motion of the output shaft 50 to the hub 36, rim 34, and tire 32 to drive the hub 36, rim 34, and tire 32 relative to the spindle 40. Because the vehicle 10 is a large, heavy-duty vehicle with very large front-wheel assemblies 18, the spindles 40 are sized large enough to house the motor 44 within the rim 34. Passenger vehicles and even some industrial/commercial vehicles are typically not large enough in size to have spindles that are large enough to house a front-wheel-assist motor within the rim.

A control module 72 (shown in FIG. 2) may control operation of the motors 44 of the front-wheel assemblies 18. The control module 72 may also control operation of the motors 27, 29 and/or gears driving the rear-wheel assemblies 16. The control module 72 can execute traction-control algorithms to control operation of the motors 44 of the front-wheel assemblies 18 and the motors and/or gears of the rear-wheel assemblies 16. Operation of the motors 44 and transmission assemblies 38 in the front-wheel assemblies 18 can improve the vehicle's traction in slippery conditions and increase tractive effort in high rolling resistance applications, which may reduce any tendency of the vehicle 10 to fish tail (especially when braking). This is because the vehicle 10 can get improved traction through operation of the front-wheel motors 44 and the rear-wheel motors 27, 29 to propel and/or brake all of the front-wheel and rear-wheel assemblies (or selected ones of the front-wheel and/or rear-wheel assemblies) of the vehicle 10 as needed. The motors 44 and transmission assemblies 38 in the front-wheel assemblies 18 can also improve rear-transmission gear life, and increase the vehicle's torque at low speeds.

Positioning the front-wheel motors 44 in the front-wheel spindles 40 as described above allows for adequate space in the front rims 34 for the transmission assemblies 38 and the brake assemblies 42. Furthermore, positioning the front-wheel motors 44 in the front-wheel spindles 40 allows the structures around the front-wheel assemblies 18 to be simplified, which reduces cost and improves durability and serviceability. Furthermore, the suspension assembly 64 and its connection to the front-wheel assemblies 18 can be simplified, which also reduces cost and improves durability and serviceability.

Figure 4:
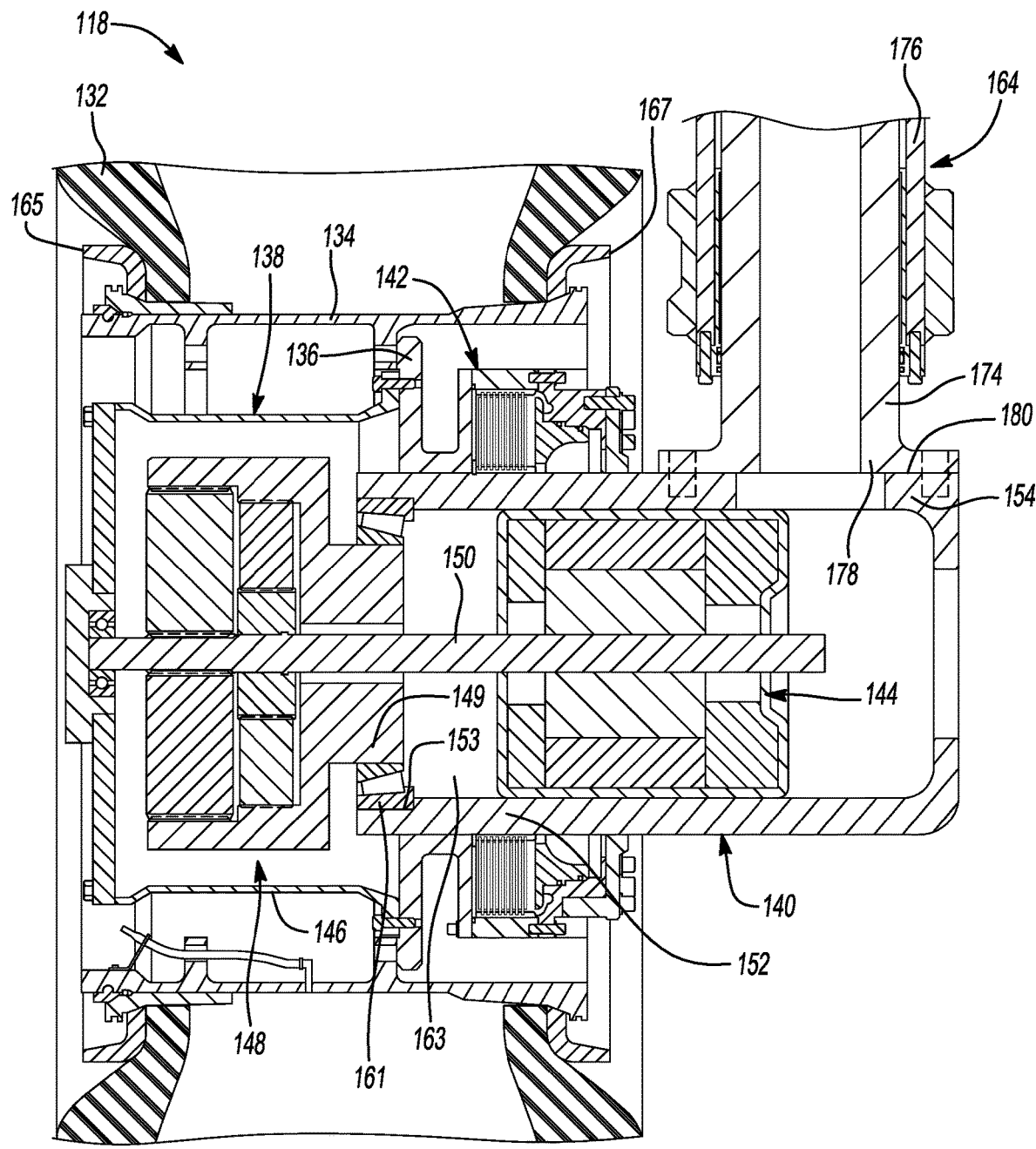
FIG. 4 is a partial cross-sectional view of another embodiment of a front-wheel assembly.

With reference to FIG. 4, another embodiment of a front-wheel assembly 118 is provided. A pair of the front-wheel assemblies 118 can be incorporated into the vehicle 10 instead of the front-wheel assemblies 18 described above. Like the front-wheel assemblies 18, each of the front-wheel assemblies 118 may include a tire 132, a rim 134, a hub 136, a transmission assembly 138, a spindle 140, a brake assembly 142, and an electric motor 144. The structure and function of the tire 132, rim 134, hub 136, and transmission assembly 138, spindle 140, brake assembly 142, and motor 144 can be similar or identical to that of the tire 32, rim 34, hub 36, and transmission assembly 38, spindle 40, brake assembly 42, and motor 44 described above. Therefore, similar features will not be described again in detail.

The spindle 140 can be a generally cylindrical body having a wheel-mount portion 152 and a suspension-mount portion 154. The spindle 140 is partially disposed within the rim 134. The spindle 140 may also include a cavity 163 that may extend through the wheel-mount portion 152 and at least partially through the suspension-mount portion 154. The motor 144 may be disposed within the cavity 163 and some or all of the motor 144 may be disposed within the rim 134 (i.e., between the opposing axial ends 165, 167 of the rim 134).

A suspension assembly 164 may be mounted to the suspension-mount portion 154 of the spindle 140. The suspension assembly 164 can be generally similar to the suspension assembly 64 described above. Like the suspension assembly 64, the suspension assembly 164 may include a first pillar member 174 and a second pillar member 176. A first axial end 178 of the first pillar member 174 may be mounted to an upper surface 180 of the suspension-mount portion 154 of the spindle 140. The opposite axial end of the first pillar member 174 is reciprocatingly received in the second pillar member 176. The second pillar member 176 may be mounted to the vehicle frame 12.

By mounting the first axial end 178 of the first pillar member 174 to the upper surface 180 of the suspension-mount portion 154 of the spindle 140 (rather than having the first pillar member 174 extend through an opening in the suspension-mount portion 154), the volume of the cavity 163 can be increased to provide space within the spindle 140 for a larger motor 144.

As described above with respect to the front-wheel assembly 18, the motor 144 of the front-wheel assembly 118 drives an output shaft 150 that engages a final drive transmission 148 (similar or identical to the transmission 48). The transmission 148 transmits the motion of the output shaft 150 to a transmission housing 146, which is rotationally fixed to the hub 136 and rim 134. In this manner, operation of the motor 144 controls rotation of the hub 136, rim 134, and tire 132 relative to the spindle 140. As described above, the control module 72 may control operation of the motors 144 of the front-wheel assemblies 118.

While not specifically shown in FIG. 4, one or more bearings (like bearing 60) may be disposed radially between the hub 136 and the wheel-mount portion 152 of the spindle 140 to facilitate rotation about the spindle 140. In some configurations, a bearing 161 may be disposed between an inner diametrical surface 153 of the spindle 140 and a hub 149 of the transmission assembly 138.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heavy-duty vehicle comprising:
   a vehicle frame;
   a plurality of rear-wheel assemblies mounted to the vehicle frame; and
   a plurality of front-wheel assemblies mounted to the vehicle frame, wherein each of the front-wheel assemblies includes:
   a rim;
   a spindle extending into the rim;
   a brake assembly disposed within the rim and extending around the spindle;
   a motor disposed within the spindle, wherein at least a portion of the motor is disposed between first and second axial ends of the rim; and
   a transmission assembly disposed within the rim, wherein the transmission assembly transmits rotary motion of the motor to the rim to rotate the rim relative to the spindle,
   wherein at least a portion of the brake assembly surrounds at least a portion of the motor.

2. The heavy-duty vehicle of claim 1, wherein each of the front-wheel assemblies includes a hub rotationally fixed to the rim and extending around a portion of the spindle, and wherein a bearing rotatably supports the hub on the spindle.

3. The heavy-duty vehicle of claim 2, wherein a first portion of the brake assembly is fixed to the hub, and wherein a second portion of the brake assembly is fixed to the spindle.

4. The heavy-duty vehicle of claim 1, wherein the brake assembly is disposed between the first and second axial ends of the rim.

5. The heavy-duty vehicle of claim 1, wherein a portion of the spindle extends out of an axial end of the rim and engages a suspension assembly.

6. The heavy-duty vehicle of claim 5, wherein the suspension assembly includes a first pillar and a second pillar, wherein a first axial end of the first pillar is attached to the spindle and a second axial end of the first pillar is reciprocatingly received in the second pillar, and wherein the second pillar is attached to the vehicle frame.

7. The heavy-duty vehicle of claim 6, wherein the first axial end of the first pillar is mounted on an upper surface of the spindle.

8. The heavy-duty vehicle of claim 1, wherein the entire motor is disposed between the first and second axial ends of the rim.

9. A heavy-duty vehicle comprising:
   a vehicle frame;
   two rear-wheel assemblies mounted to the vehicle frame; and
   two front-wheel assemblies disposed on opposing lateral sides of the vehicle frame, wherein each of the front-wheel assemblies includes:
   a rim;
   a spindle extending into the rim;
   a motor disposed within the spindle, wherein at least a portion of the motor is disposed between first and second axial ends of the rim;
   a transmission assembly disposed within the rim, wherein the transmission assembly transmits rotary motion of the motor to the rim to rotate the rim relative to the spindle; and
   a brake assembly, wherein at least a portion of the brake assembly surrounds at least a portion of the motor,
   wherein the motor, the transmission assembly, and the rim share a common longitudinal axis.

10. The heavy-duty vehicle of claim 9, wherein each of the front-wheel assemblies includes a hub rotationally fixed to the rim and extending around a portion of the spindle, and wherein a bearing rotatably supports the hub on the spindle.

11. The heavy-duty vehicle of claim 10, wherein the brake assembly is disposed within the rim and extends around the spindle, wherein a first portion of the brake assembly is fixed to the hub, and wherein a second portion of the brake assembly is fixed to the spindle.

12. The heavy-duty vehicle of claim 11, wherein the brake assembly is disposed between the first and second axial ends of the rim.

13. The heavy-duty vehicle of claim 12, wherein a portion of the spindle extends out of an axial end of the rim and engages a suspension assembly.

14. The heavy-duty vehicle of claim 13, wherein the suspension assembly includes a first pillar and a second pillar, wherein a first axial end of the first pillar is attached to the spindle and a second axial end of the first pillar is reciprocatingly received in the second pillar, and wherein the second pillar is attached to the vehicle frame.

15. The heavy-duty vehicle of claim 14, wherein the first axial end of the first pillar is mounted on an upper surface of the spindle.

16. The heavy-duty vehicle of claim 9, wherein the entire motor is disposed between the first and second axial ends of the rim.

17. A front-wheel assembly comprising:
   a rim;
   a spindle extending into the rim such that the spindle is at least partially disposed within the rim;
   a brake assembly disposed within the rim and extending around the spindle;
   a motor disposed in the spindle such that at least a portion of the motor is disposed between first and second axial ends of the rim; and
   a transmission assembly disposed within the rim, wherein the transmission assembly transmits rotary motion to the rim to rotate the rim relative to the spindle,
   wherein the motor, the transmission assembly, and the rim share a common longitudinal axis, and
   wherein at least a portion of the brake assembly surrounds at least a portion of the motor.

18. The front-wheel assembly of claim 17, wherein the brake assembly is disposed between the first and second axial ends of the rim.

19. The front-wheel assembly of claim 18, wherein each of the front-wheel assemblies includes a hub rotationally fixed to the rim and extending around a portion of the spindle, wherein a bearing rotatably supports the hub on the spindle, wherein a first portion of the brake assembly is fixed to the hub, and wherein a second portion of the brake assembly is fixed to the spindle.

20. The front-wheel assembly of claim 17, wherein the entire motor is disposed between the first and second axial ends of the rim.

* * * * *